United States Patent [19]
Kato

[11] 3,855,620
[45] Dec. 17, 1974

[54] HEAD FEED MEANS FOR MAGNETIC SPIRAL TRACK RECORDER HAVING TWO HEADS

[75] Inventor: Saburo Kato, Yokohama, Japan

[73] Assignee: Ricoh Co., Ltd., Tokyo, Japan

[22] Filed: May 18, 1973

[21] Appl. No.: 361,783

[30] Foreign Application Priority Data

May 16, 1972 Japan .............................. 47-52619

[52] U.S. Cl. .............................. 360/101, 360/107

[51] Int. Cl. .............................. G11b 21/02

[58] Field of Search........... 179/100.2 R, 100.2 T, 179/100.2 CA, 274/4 J, 11 E, 13, 13 A; 360/101, 107

[56] References Cited

UNITED STATES PATENTS

| | | | |
|---|---|---|---|
| 2,790,643 | 4/1957 | Gedde et al. | 179/100.2 R |
| 3,210,082 | 10/1965 | Murata | 274/4 J |
| 3,758,120 | 9/1973 | Kato | 360/101 |

*Primary Examiner*—Bernard Konick
*Assistant Examiner*—Robert S. Tupper
*Attorney, Agent, or Firm*—Cooper, Dunham, Clark, Griffen & Moran

[57] ABSTRACT

A device comprising a head carriage disposed on a turntable rotating at a constant rate and adapted to move at a constant pitch toward the central portion of the turntable, and a magnetic recording and reproducing head and an erasing head mounted on the head carriage with the erasing head being positioned anterior to the recording and reproducing head. The movement of the two heads which is occasioned by the movement of the head carriage is controlled so that the heads may move from the peripheral portion of the turntable toward the central portion thereof while tracing a spiral path or track on a magnetic sheet which remains stationary whereby a recording on the magnetic sheet can be erased and a new recording can be made or the recording can be reproduced.

9 Claims, 9 Drawing Figures

HEAD FEED MEANS FOR MAGNETIC SPIRAL TRACK RECORDER HAVING TWO HEADS

BACKGROUND OF THE INVENTION

This invention relates to a head feed device for magnetic recording and reproducing apparatus of the spiral track type.

In one type of magnetic recording and reproducing apparatus of the spiral track type, a recording and reproducing head is maintained in contact with the magnetic surface of a magnetic sheet and moves from the peripheral portion of the magnetic sheet to the central portion thereof while tracing a spiral path or track on the magnetic sheet to effect recording and playback of sound. Magnetic sheets of the spiral track type of the prior art require the use of an eraser which is driven by a drive independently of the recording and reproducing head when recordings on the magnetic sheets are to be erased. This has caused some inconvenience in performing recording and playback of sound on the magnetic sheets.

The magnetic recording and reproducing head of conventional magnetic recording and reproducing apparatus is arranged such that the head is fixed to a head carriage mounted on the turntable and moved from the peripheral portion to the central portion of the turntable by means of a feed screw which rotates conjointly with the rotation of the turntable. In order to save space, the feed screw is disposed such that it does not extend through the center of rotation of the turntable. Since the magnetic recording and reproducing head moves toward the center of rotation of the turntable, the head is moved toward the central portion of the turntable at a constant pitch while tracing a spiral path or track on the magnetic sheet as the turntable rotates.

When it is required to effect erasing of a recording in addition to recording and play back in this type of apparatus, an erasing head may be additionally mounted on the head carriage so that the head carriage may support the two heads. In such case, it is difficult to move the two heads as a unit toward the center of rotation of the turntable and the direction of movement of one of the two heads deviates from the center of rotation of the turntable because the two of them move together with the head carriage. This arrangement thus has the disadvantage that the pitch of movement of the heads in the peripheral portion of the turntable differs from the pitch of movement of the heads in the central portion thereof.

SUMMARY OF THE INVENTION

This invention has as its object the provision, in magnetic recording and reproducing apparatus of the spiral track type comprising an erasing head adapted to move along the same spiral path or track as the magnetic recording and reproducing head when the turntable rotates in the normal direction so that electric signals can be repeatedly recorded and reproduced on a magnetic sheet, of a head feed device which permits both the magnetic recording and reproducing head and the erasing head to move at a constant pitch from the peripheral portion of the turntable to the central portion thereof so that the two heads can trace the same spiral path or track on the magnetic sheet.

According to the invention, there is provided a head feed device in which a magnetic recording and reproducing head and an erasing head are mounted on a head carriage adapted to move in a straight line from the peripheral portion of the turntable to the central portion thereof as the turntable rotates, and the two heads are permitted to move while their movement is controlled by guide means so that the two heads move at a constant pitch toward the center of rotation of the turntable while tracing the same spiral path or track on the magnetic sheet with the erasing head moving ahead of the magnetic recording and reproducing head.

The invention obviates the disadvantages of the prior art by permitting the magnetic recording and reproducing head and erasing head to be driven by the same drive. The heads can be moved without any misoperation in the invention.

Further features and advantages of the invention will be apparent from the detailed description hereinbelow set forth, together with the accompanying drawings.

DESCRIPTION OF PREFERRED EMBODIMENTS

Figures 1, 2:
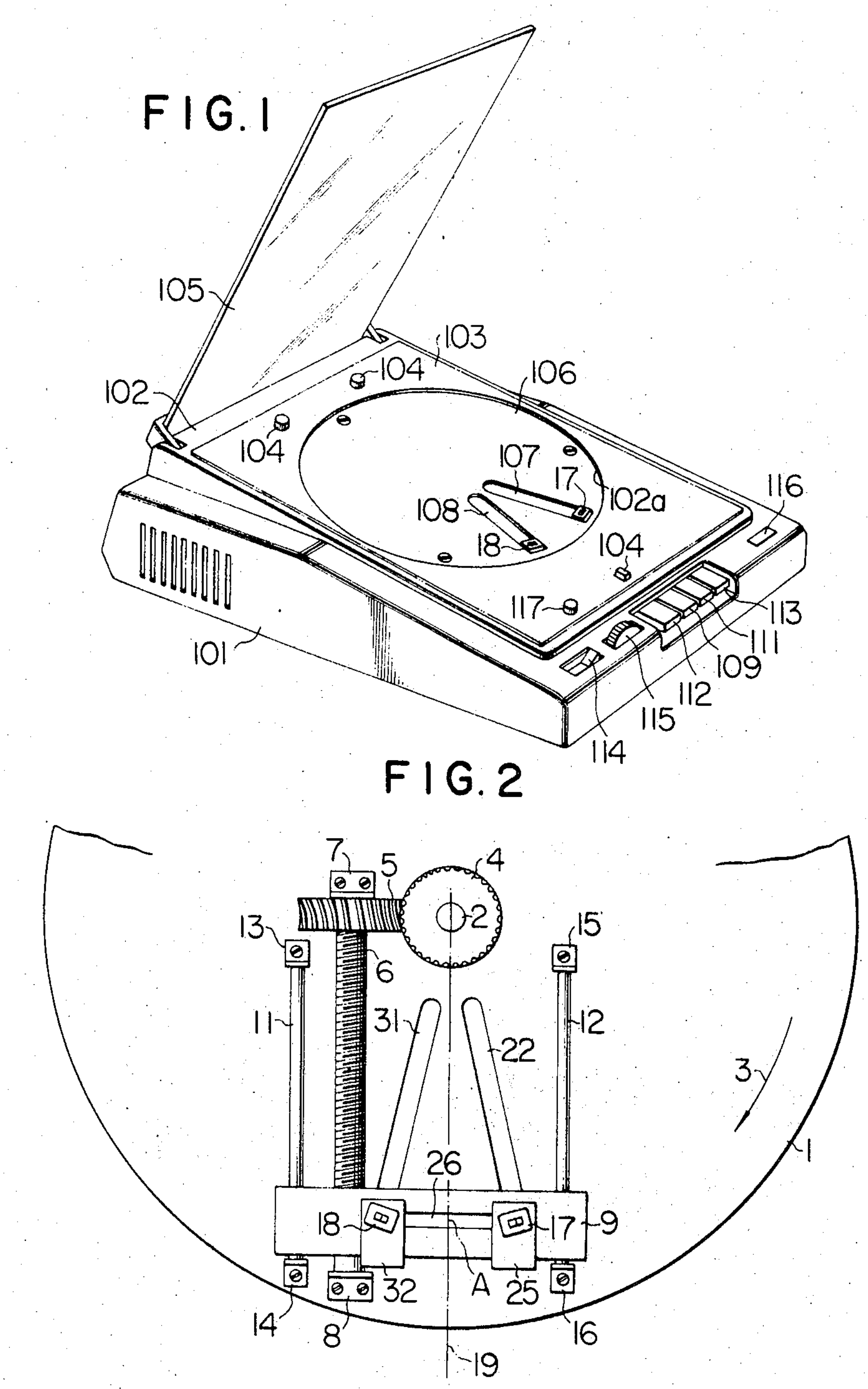
FIG. 1 is a perspective view of a magnetic recording and reproducing apparatus of the spiral track type incorporating an illustrative embodiment of the invention.
FIG. 2 is a plan view of the head feed device comprising one embodiment of the invention.

FIG. 1 shows a magnetic recording and reproducing apparatus of the sprial track type in which the invention is incorporated. The apparatus comprises an outer casing 101 having a top plate 102 for receiving a magnetic sheet 103 thereon. The magnetic sheet 103 is correctly positioned on the top plate 102 by means of three relatively short pin 104.

Hingedly connected to one end edge of the outer casing 101 is a hold-down plate 105 made of a transparent material which is adapted to hold the magnetic sheet 103 in position when it is in a lying position. Formed in the top plate 102 is a large circular opening 102*a* in which is disposed a style plate 106 substantially integral with a turntable 1 presently to be described.

Two radial slots 107 and 108 are formed in the style plate 106. A magnetic recording and reproducing head 17 and an erasing head 18 are disposed in the slots 107 and 108 respectively.

As subsequently to be described, the two heads 17 and 18 move in the slots 107 and 108 respectively at a constant pitch from the marginal portion of the turntable 1 to the central portion thereof while tracing a spiral path or track on the magnetic sheet 103 as the turntable rotates.

Initiation of rotation and temporary termination of rotation of the turntable in a playback mode can be effected by depressing a playback button 109. Quick feed of the turntable can be effected by depressing a quick feed button 111, while reversing of the direction of rotation of the turntable can be effected by depressing a reverse rotation button 112. Erasing of a recording and recording of new electric signals can be effected by simultaneously depressing a recording button 113 and the playback button 109.

A power source switch 114 and a volume control ring 115 is mounted in the apparatus and disposed leftwardly of the buttons 112, 109, 111 and 113, and a rotation speed indicating counter 116 is disposed righwardly of the buttons. A safety switch 107 is disposed in a portion of the top plate 102 near to the power source switch 114 and adapted to be actuated when the hold-down plate 105 is brought to an upright position.

In FIG. 2, the turntable 1 is supported for rotation in the direction of an arrow 3 by a shaft 2 connected to an immovable member (not shown). Secured to the shaft 2 is a worm 4 which is maintained in meshing engagement with a worm wheel 5 mounted on a feed screw 6 disposed in a plane parallel to the horizontal plane of the turntable 1 and having opposite end portions rotatably supported by support members 7 and 8 secured to the turntable 1. Thus, when the turntable 1 rotates in the direction of the arrow 3, the feed screw 6 rotates rightwardly in FIG. 2. Disposed above the feed screw 6 is a head carriage 9 having opposite end portion slidably supported by guide shafts 11 and 21 disposed parallel to each other and secured at opposite ends to support members 13, 14 and 15, 16, respectively, which in turn are secured to the turntable 1.

Figure 3:
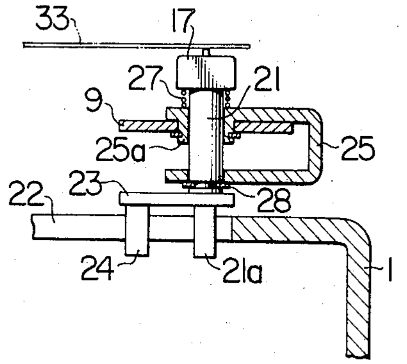
FIG. 3 is a sectional side view of the head mounting portion.

The head carriage 9 mounts thereon a magnetic recording and reproducing head 17 and an erasing head 18 disposed symmetrically with each other with respect to a normal 19 parallel to the feed screw 6. The recording and reproducing head 17 is secured, as shown in FIG. 3 to one end portion of a shaft 21 which has the other end portion 21*a* loosely received in a slot 22 formed in the turntable 1. An arm 23 fixed at its base to the shaft 21 has a rotation-preventing pin 24 planted on it and extending through the slot 22 to prevent rotation of the shaft 21.

A U-shaped mount 25 has opposite end portions loosely extending through the shaft 21 and is provided with a bush 25*a* loosely received in a slot 26 (see FIG. 2) formed in the head carriage 9. An extensive spring 27 is mounted between the recording and reproducing head 17 and the mount 25 to urge the head 17 by its biasing force to move upwardly in FIG. 3 and cause a ring 28 secured to the shaft 21 to bear against the mount 25 so as to prevent further outward axial movement of the shaft 21. Thus the head 17 is movable toward or away from the turntable 1 (perpendicularly to the plane of FIG. 2) but not movable parallel thereto.

The erasing head 18 has connected thereto a shaft and a pin (not shown) similar to the shaft 21 and pin 24 and loosely received in a slot 31 formed in the turntable 1. The head 18 is supported on a mount 32 having a bush (not shown) loosely received in the slot 26 formed in the head carriage 9. In FIG. 2, a follower (not shown) is maintained at its free end in meshing engagement with the feed screw 6 and secured at its base to the underside of the head carriage 9.

When the turntable 1 rotates in the direction of the arrow 3, the worm wheel 5 rotates about the worm 4 which is fixed, so that the worm wheel 5 rotates rightwardly in FIG. 2. The feed screw 6 which acts as a unit with the worm wheel 5 rotates in the same direction, so that the head carriage 9 is moved through the follower (not shown) toward the central portion of the turntable 1.

As the head carriage 9 moves toward the central portion of the turntable, the recording and reproducing head 17 and the erasing head 18 move in the slots 22 and 31 formed in the turntable 1 respectively toward the shaft 2 and in the slot 26 formed in the head carriage 9 toward the center A of the slot 26. Stated differently, the heads 17 and 18 move toward the central portion of the turntable 1 while tracing a spiral path or track on the magnetic surface of a magnetic sheet 33 (see FIG. 3) with which the heads 17 and 18 are maintained in contact, thereby recording or reproducing electric signals.

Preferably, convolutions of the spiral path or track traced by the two heads 17 and 18 on the magnetic sheet 3 as the turntable 1 rotates have a constant pitch at all times. Assuming that the two heads 17 and 18 move in the same direction as the direction of movement of the head carriage 9 or parallel to the feed screw 6, the distance covered by the movement of the two heads 17 and 18 on the magnetic sheet 33 or the pitch of the adjacent two convolutions of the spiral track traced by the heads will become greater as the heads draw nearer to the central portion of the turntable 1.

Figure 9:
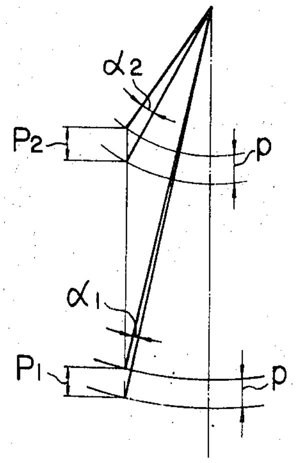
FIG. 9 shows the relation between the feed screw and the heads with respect to the pitch movement of the heads when the heads are moved parallel to the feed screw.

In FIG. 9, $p$ designates the pitch of movement of the head carriage 9 produced by one complete revolution of the turntable 1, and $\alpha$ is the angle formed by the two adjacent convolutions of the spiral track traced by the heads and the center of rotation of the turntable 1. A comparison of the pitch $P_1$ of the adjacent two convolutions of the spiral track traced by the two heads in the peripheral portion of the turntable with the corresponding pitch $P_2$ in the central portion thereof shows that $P_1 = p \sec \alpha_1$ and $P_2 = p \sec \alpha_2$. Since the angle $\alpha$ becomes greater in going toward the central portion of the turntable, the pitch of movement of the heads 17 and 18 on the magnetic sheet undergoes a change in spite of the fact that the pitch $p$ of movement of the head carriage 9 is constant.

By moving the two heads 17 and 18 in a straight line in the direction of the normal toward the center of rotation of the turntable 1 as shown in FIG. 1, it is possible to move the two heads along a spiral track whose convolutions have a constant pitch at all times so that the recording and reproducing head 17 traces the same spiral track as the erasing head 18.

Figure 4:
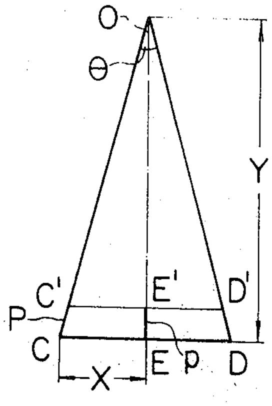
FIG. 4 shows the relation between the feed screw and the heads with respect to the pitch of movement of the heads.

As shown in FIG. 4, the relation between the feed pitch p of the feed screw 6 and the pitch $P$ of the movement of the two heads 17 and 18 can be expressed by the following formulas:

$$P = p \cdot \sqrt{X^2 + Y^2/y} \text{ or } P = p \cdot \sec \theta/2$$

where 0 is the center of the turntable, $\theta$ is the vertical angle of the isosceles triangle formed by the center O of the turntable 1 and the points C and D where the heads 17 and 18 are positioned, Y is the perpendicular OE and X is CE. That is, the pitch of movement of the heads 17 and 18 for each revolution of the turntable 1 is determined by the angle $\theta$ formed by the two slots 22 and 31 and the feed pitch p of the feed screw 6. By selecting suitable values for the angle $\theta$ and the feed pitch p, it is possible to keep the pitch of movement of the two heads constant at all times irrespective of the position in which they are disposed. It will be evident that the feed screw 6 has only to be made to have a feed pitch which satisfies the aforementioned formulas and which is smaller than the pitch of movement of the two heads 17 and 18 by $Y/\sqrt{X^2+Y^2}$.

Figure 5:
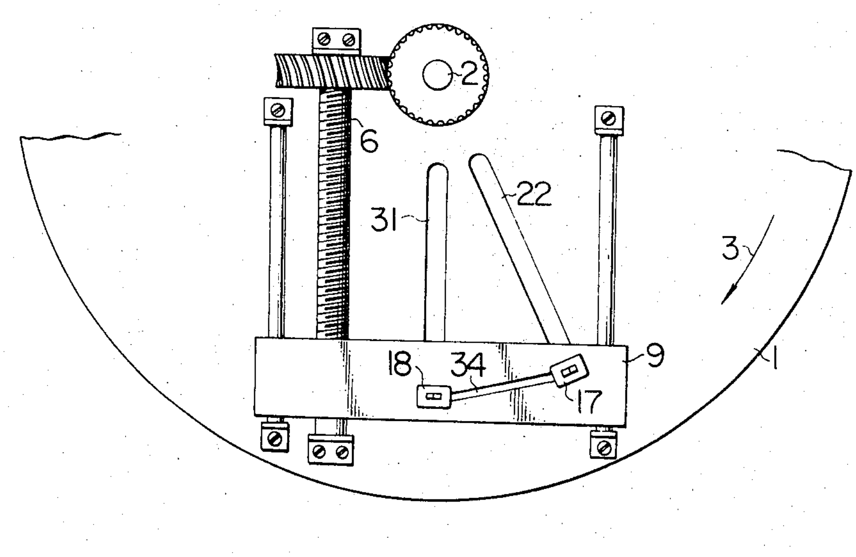
FIG. 5, FIG. 6 and FIG. 7 are plan views of other embodiments of the head feed device of the invention.
Figure 6:
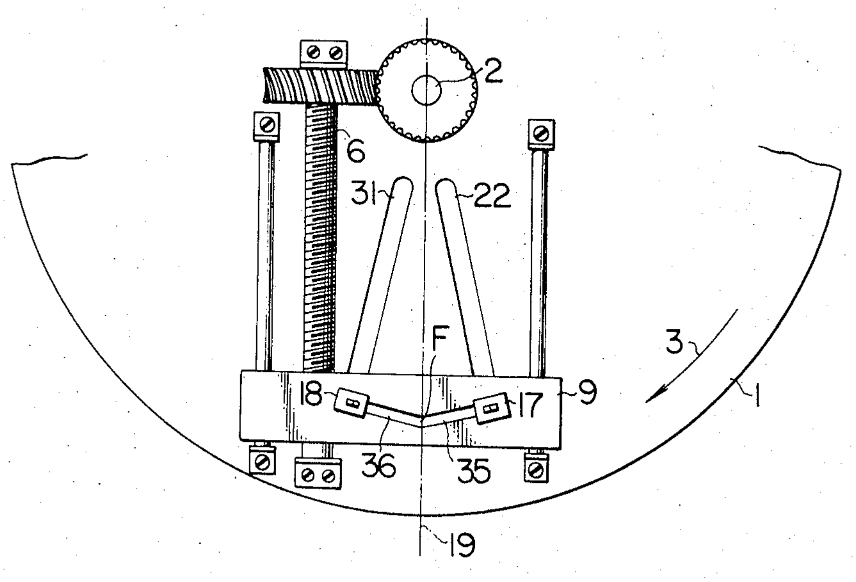

In case it is troublesome to set the feed pitch of the feed screw 6 for each revolution of the turntable 1 and the pitch of movement of the two heads 17 and 18 in accordance with the aforementioned system, it is possible to make the pitch of the feed screw 6 agree with the pitch of the two heads 17 and 18 by moving the heads as shown in FIG. 5 or FIG. 6.

In FIG. 5, the slot 31 for guiding the erasing head 18 is disposed parallel to the feed screw 6 and the recording and reproducing head 17 is disposed in a position in the head carriage 9 in which it is spaced apart from the rotary shaft 2 the same distance as the erasing head 18 is spaced apart from the rotary shaft 2. The head 17 moves in the slot 31 and a slot 34 formed in the head carriage 9 and the head 18 moves in the slots 22 and 34 as the turntable 1 rotates.

When the turntable 1 rotates in the direction of the arrow 3 and the head carriage 9 moves toward the center of the turntable 1, the pitch of convolutions of the spiral track traced by the erasing head 18 on the magnetic sheet 33 agrees with the pitch of movement of the head carriage 9 or the feed pitch of the feed screw 6. The pitch of convolutions of the spiral track traced by the recording and reproducing head 17 on the magnetic sheet 33 is always the same as the pitch of convolutions of the spiral track traced by the erasing head 18, because the rotary shaft 2 and the two heads 17 and 18 form an isosceles triangle. Thus the pitch of movement of the head 17 agrees with the feed pitch of the feed screw 6.

In FIG. 6, the slots 22 and 31 formed in the turntable 1 are disposed symmetrically with each other with respect to the normal 19 which is parallel to the feed screw 9 as is the case with the device shown in FIG. 2, but slots 35 and 36 formed in the head carriage 9 are disposed such that the slot 36 constitutes the base of the isosceles triangle formed by the slot 36, slot 31 and normal 19 and the slot 35 constitutes the base of the isosceles triangle formed by the slot 35, slot 22 and normal 19. That is, the slots 35 and 36 are disposed such that they join at a point F which is spaced apart from the rotary shaft 2 the same distance as the two heads 17 and 18 are spaced apart from the rotary shaft 2.

Thus the pitch of convolutions of the spiral track traced by the two heads 17 and 18 when the turntable 1 rotates in the direction of the arrow 3 is equal to the pitch of movement of the point F or the feed pitch of the feed screw 6. Since the heads 17 and 18 trace a spiral track, the heads 17 and 18 should be mounted on the shafts 21 (only one of such shafts is shown in FIG. 3) such that they are displaced from each other by $\theta P/360°$ with respect to the direction of movement from the peripheral portion of the turntable to its central portion.

Figure 7:
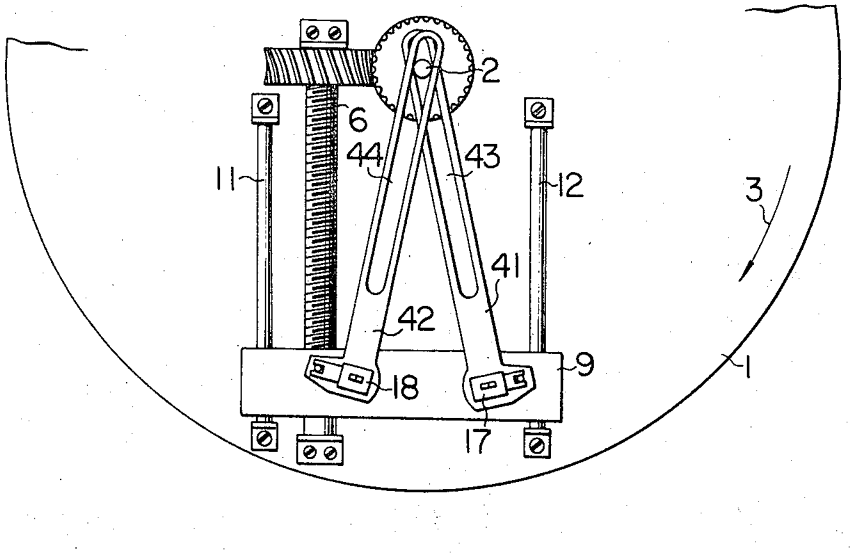

FIG. 7 shows another embodiment of the invention in which guides 41 and 42 are pivotally supported by the head carriage 9 at their free ends which support the recording and reproducing head 17 and the erasing head 18 respectively, and formed therein with guide slots 43 and 44 respectively which loosely receive the upper end portion of the rotary shaft 2. As the turntable 1 rotates in the direction of the arrow 3 and the head carriage 9 moves toward the center of the turntable 1, the guides 41 and 42 move toward the rotary shaft 2 which is disposed in the guide slots 43 and 44, so that the two heads 17 and 18 can be disposed in the normal position with respect to the center of rotation of the turntable 1.

Figure 8:
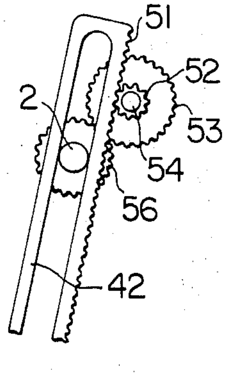
FIG. 8 is a plan view of one form of head drive.

If a drive force is imparted to the guides 41 and 42 to move the head carriage 9 when the turntable rotates, the feed screw 6 can be done without. FIG. 8 shows one example of means for providing a drive force. A pinion 52 adapted to mesh with a rack 51 provided at one side edge of the guide 42 and a planetary gear 53 substantially integral with the pinion 52 are supported by a shaft 54 connected to the turntable 1. The planetary gear 53 is maintained in meshing engagement with a gear 56 supported by a shaft 2 and turns about the gear 56 when the turntable 1 rotates. The movement of the planetary gear 53 causes the pinion 52 to move the rack 51, so that the guide 42 and the erasing head 18 mounted on the guide 42 move toward the rotary shaft 2.

A similar rack-and-pinion arrangement is mounted on the other guide 41 so as to move the head carriage 9 supporting the heads 17 and 18 along the guide shafts 11 and 12 shile the heads 17 and 18 are maintained in correct positions by the guides 41 and 42 with respect to the center of rotation of the turntable 1.

While the means for imparting a drive force to the guides 41 and 42 shown in FIG. 8 is a rack-and-pinion arrangement, it is to be understood that the invention is not limited to this specific form of drive force imparting means, and that any known means, such as a device relying on a cam and a spiral groove, may be used instead.

What is claimed is:

1. A head feed device for magnetic recording and reproducing apparatus of the spiral track type comprising a. a turntable;
b. a head carriage;
c. means mounting said head carriage on said turntable for movement of the carriage in a straight line at a constant pitch from the peripheral portion of the turntable to the central portion thereof as the turntable rotates in a predetermined direction;
d. a magnetic recording and reproducing head supported by said head carriage for movement from the peripheral portion of the turntable to the central portion thereof while tracing a spiral track of a constant pitch as the turntable rotates in said predetermined direction and the head carriage moves in a straight line from the peripheral portion of the turntable to the central portion thereof;
e. an erasing head supported by said head carriage for movement to trace the same spiral track as the magnetic recording and reproducing head;
f. means for guiding said two heads along converging straight lines passing through the center of rotation of the turntable, such that said erasing head precedes said recording head along said track in movement toward the turntable central portion, while maintaining said erasing head closer than said recording head to the center of turntable rotation by a radial distance equal to $P\theta/360$ wherein $P$ is the pitch of said track and $\theta$ is the angle, in degrees, included between said straight lines; and g. means driven by rotation of said turntable in said predetermined direction for moving said carriage and heads toward the center of the turntable as aforesaid.

2. A device according to claim 1 wherein said means for guiding said two heads includes two radial slots formed in the turntable and a slot formed in the head carriage.

3. A device according to claim 2 wherein said two slots constitute equal sides of an isosceles triangle whose vertex is the center of rotation of the turntable and whose base is the slot formed in the head carriage.

4. A device according to claim 3, further including a feed screw for moving said carriage in correspondence with rotation of said turntable, and wherein one of said two slots is disposed parallel to said feed screw.

5. A device according to claim 2 wherein said slot formed in the head carriage is disposed along the bases of two isosceles triangles whose sides of equal length are the two slots formed in the turntable and a normal extending through the center of rotation of the turntable and the point where the bases of the two isosceles triangles meet.

6. A device according to claim 1 wherein said means for guiding said two heads comprises two guides each connected at one end to one end of said heads and each having a slot loosely receiving the upper end portion of a rotary shaft supporting the turntable.

7. A device according to claim 6, including a rotary shaft and means for transmitting drive from said shaft directly to said two guides.

8. Apparatus for moving a pair of magnetic transducer heads in tandem along a common spiral path, comprising, in combination, a. two magnetic transducer heads;

b. a turntable rotatable about a central axis for supporting said heads for rotation with said turntable; and c. means, driven by rotation of said turntable, for simultaneously moving said two heads radially of said turntable during rotation thereof such that said heads successively trace a common spiral track of constant pitch P progressively approaching said axis as said turntable rotates in a predetermined direction;

d. said moving means including means for guiding movement of said heads relative to said turntable along converging rectilinear radial paths intersecting said axis such that one of said heads precedes the other of said heads along predetermined direction, while maintaining said one head closer than the other to said axis by a radial distance equal to P$\theta$/360, wherein $\theta$ is the angle, in degrees, included between said paths.

9. Apparatus as defined in claim 8, wherein said moving means further includes a carriage movably supported by said turntable and movably supporting said heads; and means for moving said carriage in translation toward and away from the turntable axis in a plane perpendicular to said axis; wherein said turntable has a pair of radial slots respectively defining the paths of movement of said heads, wherein said carriage has a slot extending generally transversely of said radial slots, and wherein said guiding means includes a pair of guide members each connected to one of said heads and projecting therefrom through said carriage slot into one of said radial slots such that said heads are respectively guided in movement by said radial slots.

* * * * *